(12) United States Patent
Byun et al.

(10) Patent No.: US 7,293,790 B2
(45) Date of Patent: Nov. 13, 2007

(54) OMNI-DIRECTIONAL TOY VEHICLE

(75) Inventors: Kyungseok Byun, Seongnam (KR); Kyuman Choi, Seoul (KR); Seungyoup Lee, Seoul (KR)

(73) Assignee: Bstech Co. Ltd., Seoul (KR)

(*) Notice: Subject to any disclaimer, the term of this patent is extended or adjusted under 35 U.S.C. 154(b) by 310 days.

(21) Appl. No.: 10/504,648

(22) PCT Filed: Feb. 13, 2003

(86) PCT No.: PCT/KR03/00302

§ 371 (c)(1), (2), (4) Date: Mar. 15, 2005

(87) PCT Pub. No.: WO03/068352

PCT Pub. Date: Aug. 21, 2003

(65) Prior Publication Data

US 2005/0153629 A1    Jul. 14, 2005

(30) Foreign Application Priority Data

Feb. 15, 2002 (KR) .............. 10-2002-0008035

(51) Int. Cl.
*B62M 1/02* (2006.01)

(52) U.S. Cl. .............. 280/262; 280/259; 280/233; 280/249; 280/242.1; 180/6.2

(58) Field of Classification Search ........... 280/282, 280/259, 233, 249, 242.1; 180/6.2
See application file for complete search history.

(56) References Cited

U.S. PATENT DOCUMENTS 4,335,899 A * 6/1982 Hiscock ............... 280/259
4,361,338 A 11/1982 Kuchenbecker
4,546,989 A 10/1985 Peterson
4,580,802 A 4/1986 Herman et al.
5,288,092 A * 2/1994 Miller et al. ............... 280/244
5,297,810 A * 3/1994 Lukyanov ............... 280/250.1
5,323,867 A * 6/1994 Griffin et al. ............... 180/22
6,757,936 B2 * 7/2004 Yamaguchi et al. ......... 16/47
6,857,707 B2 * 2/2005 Guile ................... 301/5.23
2004/0251655 A1 * 12/2004 Lindsay et al. ............ 280/282

FOREIGN PATENT DOCUMENTS

JP    8 52278    2/1996

* cited by examiner

*Primary Examiner*—Lesley D. Morris
*Assistant Examiner*—Marlon Arce-Diaz
(74) *Attorney, Agent, or Firm*—Ladas & Parry LLP

(57) ABSTRACT

The invention relates with the omni-directional toy vehicle that can move in all directions of forward, backward, rotational, left and right movement by driving manually the omni-directional wheels installed at the vehicle and combining their rotational directions. The vehicle characterized by comprising a frame composing the body of the vehicle, at least three rotating axles which are installed at the lower part of the frame with a rotatable mechanism, at least three omni-directional wheels which are connected to the axles, at least three driving element which are connected to the axles and drive the omni-directional wheels and a seat located at the upper part of the frame. The vehicle can be driven and steered simultaneously by means of driving combinations of each omni-directional wheel without any additional steering element and make an operator be interested in the manual operation of omni-directional wheels.

27 Claims, 13 Drawing Sheets

(a)

(b)

(c)

(d)

(e)

(f)

(g)

131

132

OMNI-DIRECTIONAL TOY VEHICLE

TECHNICAL FIELD

The present invention relates to the omni-directional toy vehicle, and more particularly to the omni-directional toy vehicle that can move in all directions of forward, backward, rotational, left and right movement by driving manually the omni-directional wheels installed at a toy vehicle and combining their rotational directions.

BACKGROUND OF THE ART

General vehicles and mobile robots are divided into the independent two driving wheel mechanism and the steering and driving mechanism according to the driving mechanism. The present driving mechanisms mentioned above have the limited movement, that is, they can not instantaneously move in the side direction without rotating directly the body of vehicle in a state of forward movement. Because of this limitation of movement, it is difficult to move in a narrow space and it is necessary to calculate the complex path in order to reach a destination.

The omni-directional driving mechanism was devised to overcome the aforementioned defects. The omni-directional driving mechanism can instantaneously move in any direction in any state of motion by making it possible to have 3 degree of freedom motion (longitudinal, lateral and rotational).

For the omni-directional driving, several types of omni-directional mechanism were proposed and, in general, they are classified into two methods. The one is the adoption of conventional wheels. The other is the adoption of specially designed wheels for the omni-directional driving. Off-centered wheel mechanism, which is a typical mechanism of conventional wheels, has steering axles installed off-centered from each wheel center at each wheel so that it can be omni-directionally driven by steering and driving each wheel. There are Universal wheel, Mechanum wheel, Double wheel, Alternate wheel, Half wheel, Orthogonal wheel and Ball wheel among the specially designed wheels for omni-directional driving. Their shapes are different each other but they commonly have the active mode of transferring the driving force through the rotation of wheels and the passive mode of free rotation without transferring the driving force. Wheels which are applied to the omni-directional driving with the aforementioned active and passive mode are referred to as the omni-directional wheels.

FIG. 1 shows a schematic configuration of omni-directional wheels. Universal wheels shown at (a) of FIG. 1 is the most traditional among omni-directional wheels and comprises several passive rollers which rotate freely at each axis. Here, the rotation axis of each passive roller is tangent to the wheel circumference respectively. But the discontinuous contact with the ground resulted from the gap between the passive rollers makes a Universal wheel applied vehicle be vertically vibrated.

Mechanum wheel and Double wheel shown at (b) and (c) of FIG. 1 respectively were proposed to remove the vertical vibration. Each roller of the Mechanum wheel is arranged at the angle of 45 degrees with the wheel axis and the Double wheel is overlapped with two wheels. But, their translational operation results in the horizontal vibration because they are also in discontinuous contact with the ground. And, even though the wheels rotate with a constant angular velocity, the turning speed of the Mechanum wheel or the Ball wheel applied vehicle is not constant during its turning operation because the distance between the wheel and the center of vehicle changes at the existence of discontinuous contact. Furthermore, the Mechanum wheel functions as a decelerator so that it makes an effect of the increase of inertia, which means that the operation efficiency of the Mechanum wheel applied vehicle is decreased.

The Alternate wheel and Half wheel shown at (d) and (e) of FIG. 1 respectively were proposed to minimize the horizontal and vertical vibration. The Alternate wheel has the shape that small and large rollers are arranged by turns and the half wheel has the shape that half cut rollers are serially overlapped.

The Orthogonal wheel shown at (f) of FIG. 1 has two roller of which axes of rotation are perpendicular each other and the Ball wheel shown at (g) of FIG. 1 embodies the active and passive mode with the sphere type wheel.

The aforementioned omni-directional wheels have shortcomings respectively but, contrary to conventional wheels, they have the driving torque transferring direction by the active mode and the external force driven free rotation direction by the passive mode so that they have the advantage of 3 degree of freedom motion (longitudinal, lateral and rotational) at a two dimensional space.

In regard to this, Roger F. Hiscock proposed an omni-directional wheel applied toy vehicle on American U.S. Pat. No. 4,335,899.

FIG. 2 shows a schematic configuration of the toy vehicle of the aforementioned patent.

Referring to FIG. 2, the toy vehicle 10 comprises a frame 15 and a seat 20 located at the rear upper part of the frame 15. Rear wheels 25 installed at the rear part of the frame 15 are rotatable by the driving axle 30 and the housing 35 covers the supporting axle 45 in front of the frame 15. Multiple rollers 70 which are rotatable in the direction perpendicular to the direction of rotation of the rear wheels 25 are arranged at the circumference of the rear wheels 25. Also, the front wheels 40 installed in front of the frame 15 are rotatable by the supporting axle 45 and connected to the housing 35 via the pin 50 so that the toy vehicle 10 can be steerable. That is, the front wheels 40 are steered by the handle 55 and, in detail, by the steering axle 60 connected to the handle 55 in connection with the steering link engaged with the steering axle 60. The pedals 65 are located near the housing 35 and connected to the driving axle 30 via a chain or a sprocket so that their operation can drive the rear wheels 25.

But, even though the toy vehicle 10 adopts the omni-directional wheel of universal wheel type for the rear wheels, it can not perfectly move in all directions because two rear wheels 25 are not operated independently as well as the toy vehicle is steered by steering the front wheels 40 connected to the handle 55.

DISCLOSURE OF THE INVENTION

The invention was conceived to solve the aforementioned problems. It is the first object of the invention to propose a toy vehicle that can move in all directions of forward, backward, rotational, left and right movement by driving independently the omni-directional wheels applied to all wheels and combining their rotational directions.

It is the second object of the invention to propose a toy vehicle that makes the operators happy by driving and steering simultaneously by means of the combination of rotational directions of the omni-directional wheels without any steering device and driving them manually.

Another objects and advantages of the invention will be described hereinafter, and will be known by the embodiments of the invention. Also objects and advantages of the invention may also be embodied by the means and combinations thereof, disclosed in the claims appended.

BRIEF DESCRIPTION OF DRAWINGS

Since the following drawings appended in this specification illustrate preferred embodiments of the invention and will serve to teach more the technical spirit of the invention together with the detailed description of the invention as will be described. The invention should not be limited to and construed only as depicted in the drawings.

BEST MODE FOR CARRYING OUT THE INVENTION

Hereinafter, preferred embodiments of the invention will be described in detail with referenced to the appended drawings.

Prior to the description, it should be noted that terms and words used in the description and claims must not be limited and interpreted to be typical or literal, and should be construed as the meaning and concept conforming to the technical spirit of the invention on the basis that the inventor can define the concept of the terms and words to describe the invention in a best way.

Accordingly, since the embodiments described in the present invention and configurations shown the drawings are the most preferred embodiments only and do not represent all of technical spirit of the invention, it should be understood that there may be various equivalents and modification examples that may replace them at the time of application of present invention.

EMBODIMENT 1

Figure 1:
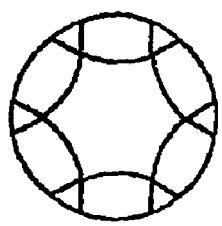
FIG. 1 shows schematic configuration of omni-directional wheels for the explanation.
Figure 1:
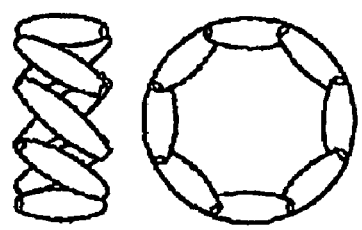
Figure 1:
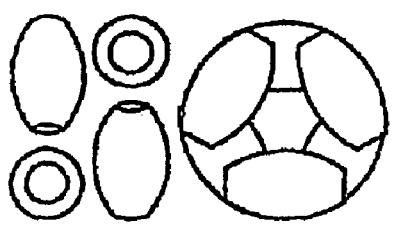
Figure 1:
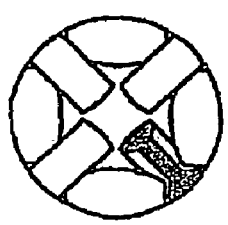
Figure 1:
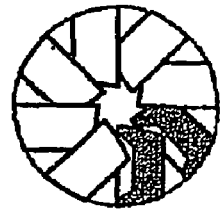
Figure 1:
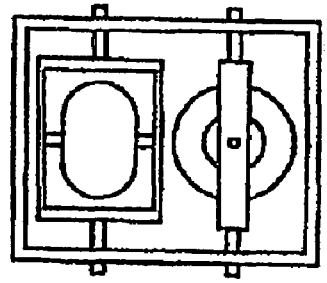
Figure 1:
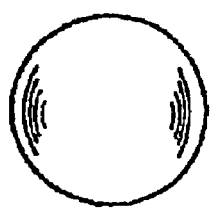
Figure 2:
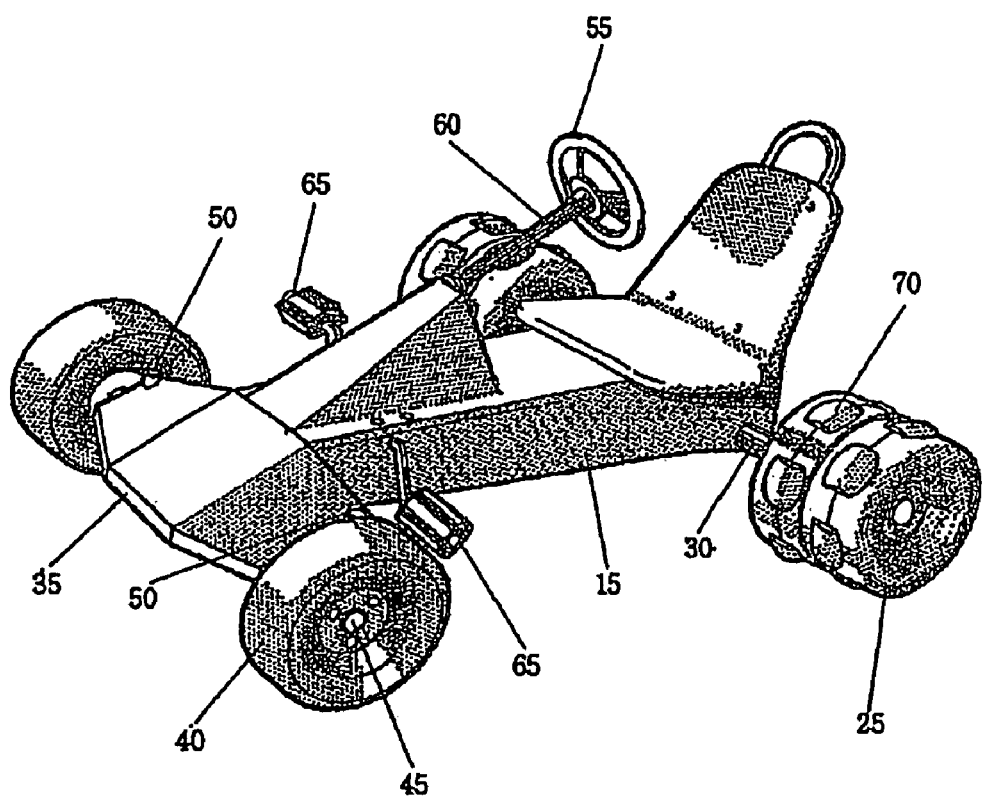
FIG. 2 shows a schematic configuration for the explanation of an exemplary toy vehicle.
Figure 3:
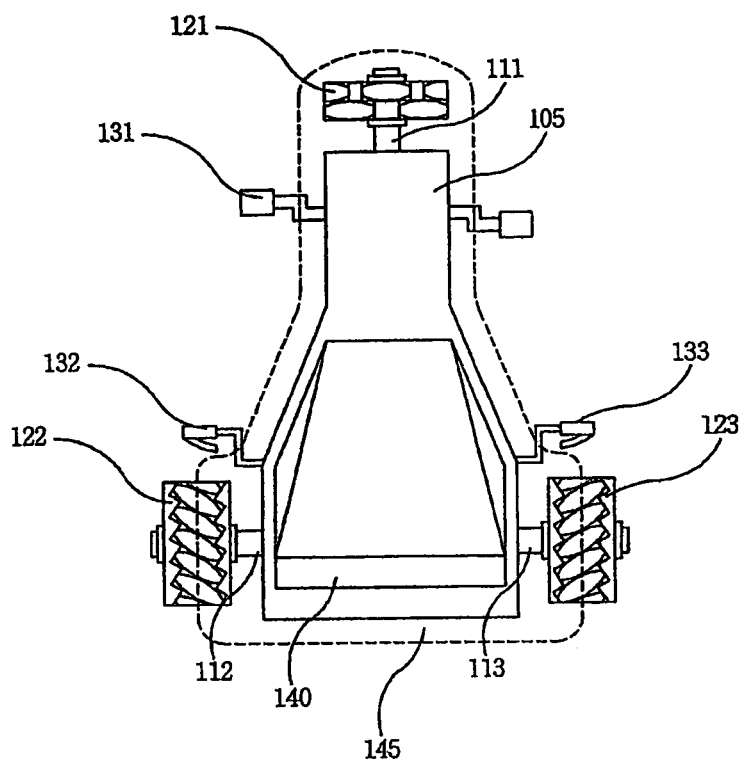
FIG. 3 shows a plan view of the omni-directional toy vehicle according to the first embodiment of the present invention.

FIG. 3 shows a plan view of the omni-directional toy vehicle according to the first embodiment of the present invention.

Referring to FIG. 3, the toy vehicle 100 according to this embodiment comprises the frame 105, the first to the third rotating axles 111, 112, 113, the first to the third omni-directional wheels 121, 122, 123, the first to the third driving elements 131, 132, 133, and the seat 140. The housing 145 of which shape may be a car, a motorcycle, or a character, etc. covers the frame 105.

The first to the third rotating axles 111, 112, 113 arc arranged at the lower part of the frame 105 with a rotatable mechanism and the first rotating axle 111 which is perpendicular to the second rotating axle 112 and the third rotating axle 113 is arranged in front of the frame 105. Also, the first to the three omni-directional wheels 121, 122, 123 arc installed at each one side of the first to the third rotating axles 111, 112, 113 respectively. The first to the third driving elements 131, 132, 133 are connected to the frame 105 and make the first to the third omni-directional wheels 121, 122, 123 rotatable by transferring the driving forces of the first to the third rotating axles 111, 112, 113. Furthermore, an operator can take the seat 140 located at the upper part of the frame 105.

Figure 4:
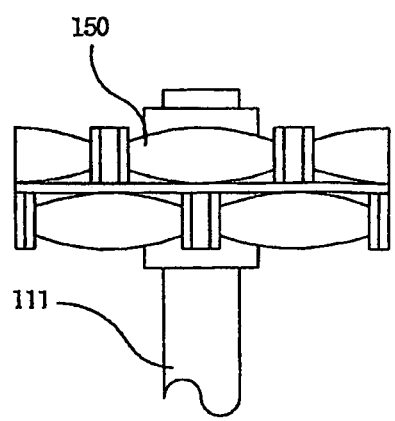
FIG. 4 shows a plan view of the first omni-directional wheel of the omni-directional toy vehicle shown on FIG. 3.

FIG. 4 shows a plan view of the first omni-directional wheel of the omni-directional toy vehicle shown on FIG. 3.

Referring to FIG. 4, the first omni-directional wheel 121 according to the embodiment of present invention is the Double wheel. The Double wheel can move in the direction perpendicular to the rotating axle because multiple passive rollers are arranged at the circumference of the wheel. Namely, the first omni-directional wheel installed at the one side of the first rotating axle 111 can move in the left and right direction bad means of the first rotating axle 111 and simultaneously in the forward and backward direction by means of the multiple passive rollers. At this time, the first omni-directional wheel 121 functions as a front wheel.

Figure 5:
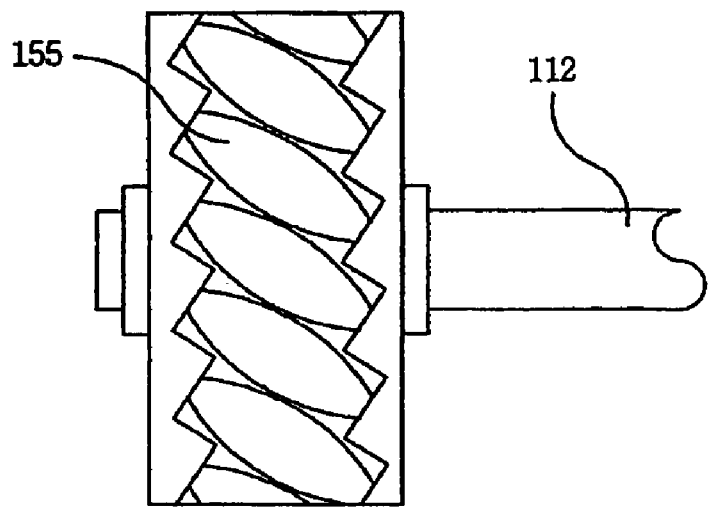
FIG. 5 shows a plan view of the second omni-directional wheel of the omni-directional toy vehicle shown on FIG. 3.

FIG. 5 shows a plan view of the second omni-directional wheel of the omni-directional toy vehicle shown on FIG. 3.

Referring to FIG. 5, the second omni-directional wheel 122 according to the embodiment of present invention is the Mechanum wheel. Multiple passive rollers are arranged at the circumference of the wheel at the angle of 45 degrees with the rotating direction. Namely, the second omni-directional wheel 122 installed at the one side of the second rotating axle 112 can move in the forward and backward direction by the second rotating axle 112 and simultaneously in the direction of 45 degrees with the second rotating axle 112. At this time, the second omni-directional wheels 122 functions as a rear wheel.

Figure 6:
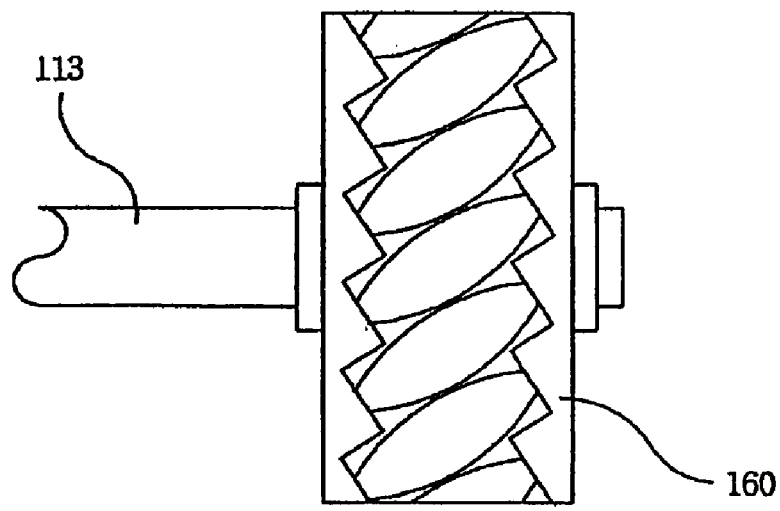
FIG. 6 shows a plan view of the third omni-directional wheel of the omni-directional toy vehicle shown on FIG. 3.

FIG. 6 shows a plan view of the third omni-directional wheel of the omni-directional toy vehicle shown on FIG. 3.

Referring to FIG. 6, the third omni-directional wheel 123 according to the embodiment of present invention is the Mechanum wheel. Multiple passive rollers are arranged at the circumference of the wheel at the angle of 45 degrees with the rotating direction. Namely, the third omni-directional wheel 123 installed at the one side of the third rotating axle 113 can move in the forward and backward direction by the third rotating axle 113 and simultaneously in the direction of 45 degrees with the third rotating axle 112. At this time, the third omni-directional wheels 123 functions as a rear wheel.

Figure 7:
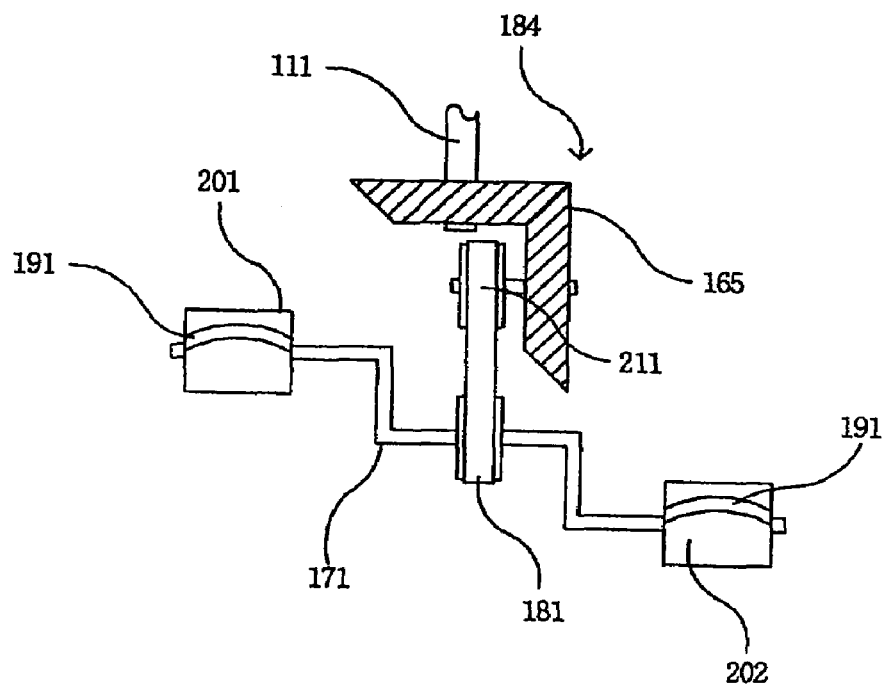
FIG. 7 shows a plan view of the first driving element of the omni-directional toy vehicle shown on FIG. 3.

FIG. 7 shows a plan view of the first driving element of the omni-directional toy vehicle shown on FIG. 3.

Referring to FIG. 4 and FIG. 7, the first driving element 131 for driving the first omni-directional wheel 121 by use of operator's foot comprises the first driving handle 171, the first driving torque transferring element 181, and the forth driving torque transferring element 184. The first and the second pedal 201, 202 are attached at both side of the first driving handle 171 and the cover hands 191 of the first and the second pedal 201, 202 make it easy to drive the first driving element 131 manually.

The first driving torque transferring element 181 uses a pulley and is connected to the forth driving torque transferring element 184 via the first belt 211. At this time, the forth driving torque transferring element 184 includes the bevel gear element 165 of which one side is connected to the first rotating axle 111. Namely, the forward and backward (referred to as longitudinal) rotation of the first driving handle 171 is changed into the left and right (referred to as lateral) rotation by means of the bevel gear element 165 so that the first omni-directional wheel 121 can rotate laterally in connection with the first rotating axle 111.

Figure 8:
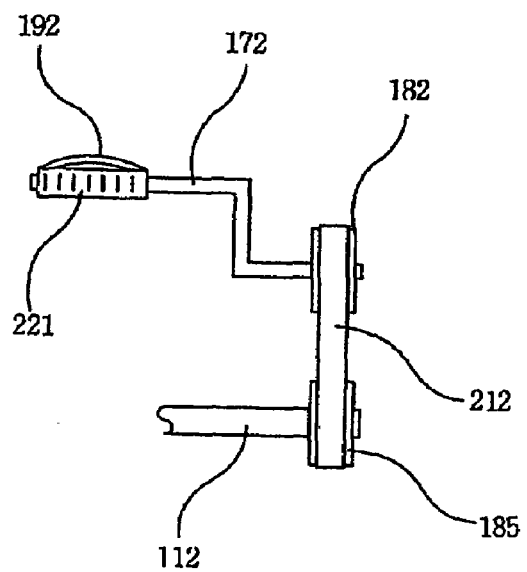
FIG. 8 shows a plan view of the second driving element of the omni-directional toy vehicle shown on FIG. 3.

FIG. 8 shows a plan view of the second driving element of the omni-directional toy vehicle shown on FIG. 3.

Referring to FIG. 5 and FIG. 8, the second driving element 132 for driving the second omni-directional wheel 122 by use of operator's hand comprises the second driving handle 172, the second driving torque transferring element 182, and the fifth driving torque transferring element 185. The first grip 221 is attached at one side of the second driving handle 172 and the cover band 192 of the first grip 221 make it easy to drive the second driving element 132 manually by means of operator's hand.

The second driving torque transferring element 182 uses a pulley and is connected to the fifth driving torque transferring element 185 via the second belt 212. At this time, the fifth driving torque transferring element 185 also uses a pulley and is connected to the second rotating axle 112. Namely, the longitudinal rotation of the second driving handle 172 is transmitted to the second rotating axle 112 so that the second omni-directional wheel 122 can rotate longitudinally.

Figure 9:
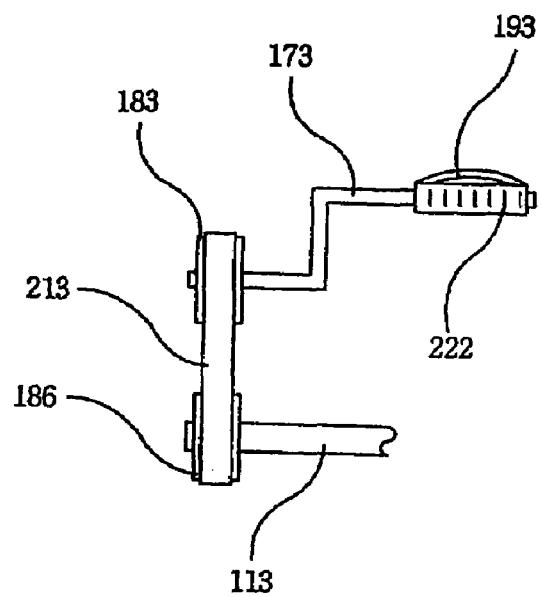
FIG. 9 shows a plan view of the third driving element of the omni-directional toy vehicle shown on FIG. 3.

FIG. 9 shows a plan view of the third driving element of the omni-directional toy vehicle shown on FIG. 3.

Referring to FIG. 6 and FIG. 9, the third driving element 133 for driving the third omni-directional wheel 123 by use of operator's hand comprises the third driving handle 173, the third driving torque transferring element 183, and the sixth driving torque transferring element 186. The second grip 222 is attached at one side of the third driving handle 173 and the cover band 193 of the second grip 222 makes it easy to drive the third driving element 133 manually by means of operator's hand.

The third driving torque transferring element 183 uses a pulley and is connected to the sixth driving torque transferring element 186 via the third belt 213. At this time, the sixth driving torque transferring element 186 also uses a pulley and is connected to the third rotating axle 113. Namely, the longitudinal rotation of the third driving handle 173 is transmitted to the third rotating axle 113 so that the third omni-directional wheel 123 can rotate longitudinally.

Figure 10:
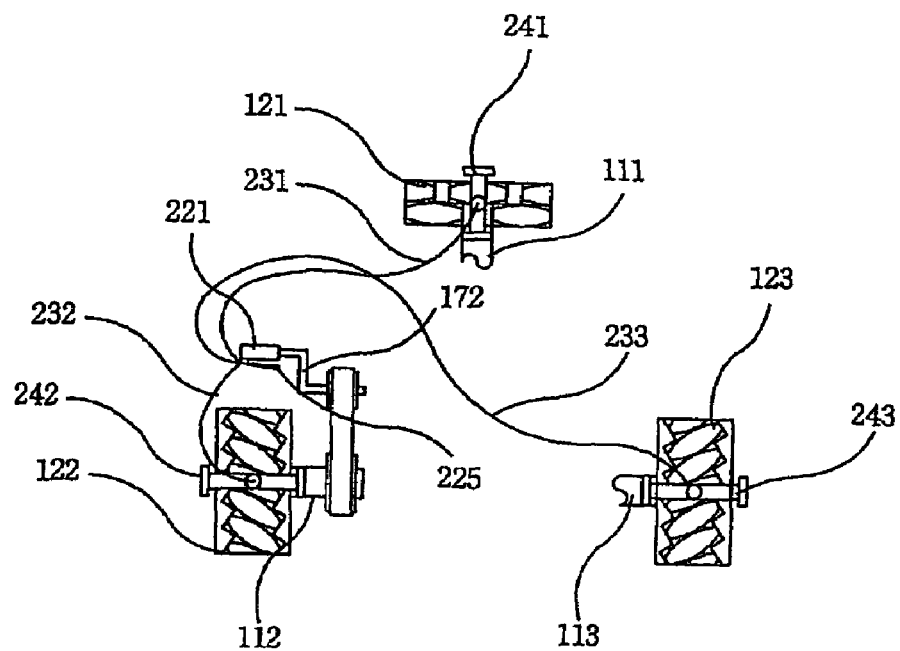
FIG. 10 shows a plan view of the braking element of the omni-directional toy vehicle shown on FIG. 3.

FIG. 10 shows a plan view of the braking element of the omni-directional toy vehicle shown on FIG. 3.

Referring to FIG. 10, the braking element 205 comprises the braking handle 225, the first and third braking wires 231, 232, 233, and the first and the third braking devices 241, 242, 243. The one side of the braking handle 225 is connected to the first grip 221 of the second driving handle 172 with a rotatable mechanism. Also, each one side of the first and the third braking wires 231, 232, 233 are connected to the one side of the braking handle 225 respectively and the other side of the first to the third braking wires 231, 232, 233 are connected to the first to the third braking devices 241, 242, 243 installed near the circumference of the first to the third omni-directional wheels 121, 122, 123 respectively. Namely, when the bracing handle 225 is held tight, the first to the third braking wires 231, 232, 233 are pulled by means of the principle of lever and the first to the third braking devices 241, 242, 243 connected to the first to the third braking wires 231, 232, 233 respectively contact with the first to the third omni-directional wheels 121, 122, 123 respectively so that the first to the third omni-directional wheels 121, 122, 123 stop running simultaneously.

Figure 11:
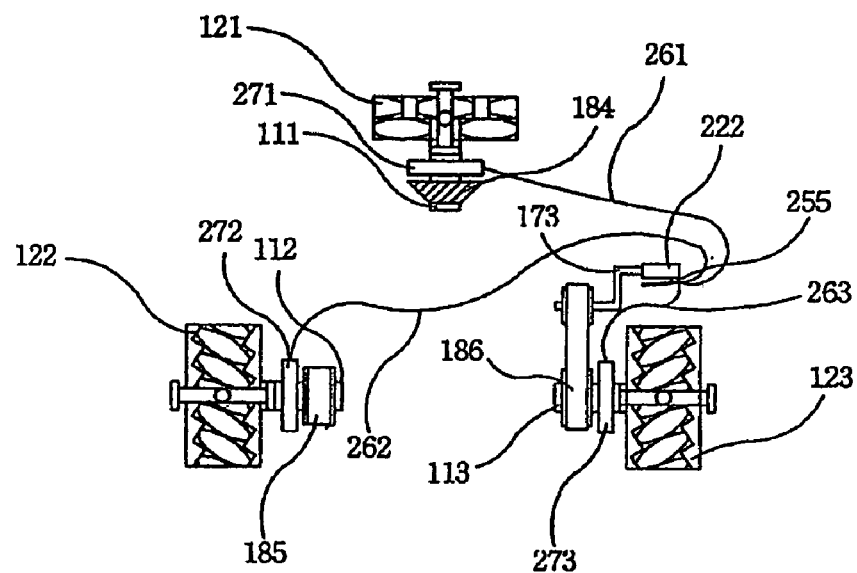
FIG. 11 shows a plan view of the clutch element of the omni-directional toy vehicle shown on FIG. 3.

FIG. 11 shows a plan view of the clutch element of the omni-directional toy vehicle shown on FIG. 3.

Referring to FIG. 11, a conventional passive clutch is used as the clutch element 250 of the embodiment of present invention and it comprises the clutch handle 255, the first to the third clutch wires 261, 262, 263, and the first to the third clutch devices 271, 272, 273. The one side of the clutch handle 255 is connected to the second grip 222 of the third driving handle 173 with a rotatable mechanism. Also, each one side of the first to the third clutch wires 261, 262, 263 are connected to the one side of the clutch handle 255 respectively and the other side of the first to the third clutch wires 261, 262, 263 are connected to the first to the third clutch devices 271, 272, 273 installed near the first to the third driving torque transferring elements 184, 185, 186 respectively. Namely, when the clutch handle 255 is held tight, the first to the third clutch wires 261, 262, 263 are pulled by means of the principle of lever and the first to the third clutch devices 271, 272, 273 connected to the first to the third clutch wires 261, 262, 263 function respectively so that transmissions of driving torques to the first to the third omni-directional wheels 121, 122, 123 are intermitted simultaneously.

Hereinafter, operating method of the toy vehicle 100 according to this embodiment of present invention is disclosed as follows.

Figure 12:
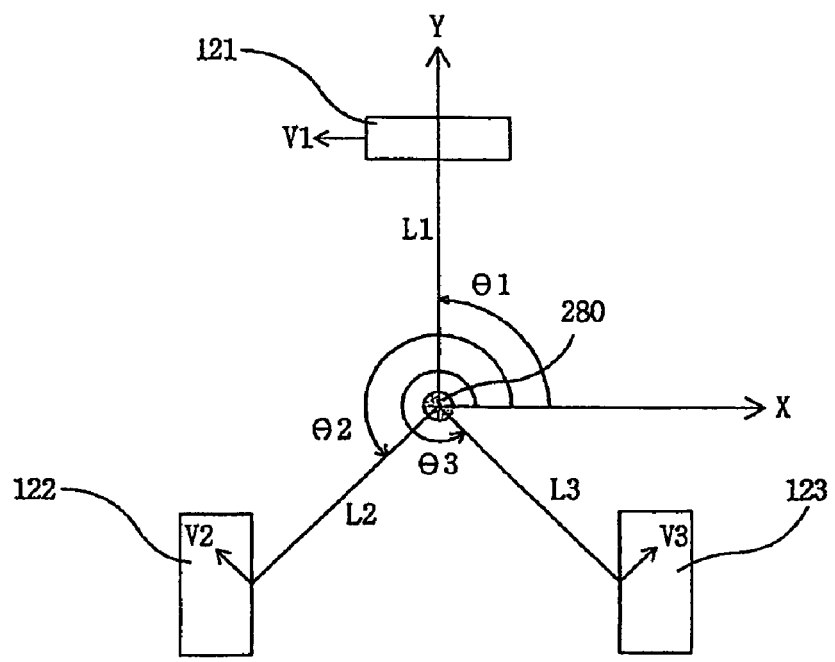
FIG. 12 shows a schematic configuration of the operating method of the omni-directional toy vehicle shown on FIG. 3.

FIG. 12 shows a schematic configuration of the operating method of the omni-directional toy vehicle shown on FIG. 3.

Referring to FIG. 12, the velocity of the toy vehicle is described as follows, where $V_X$ and $V_Y$ are velocities in X and Y coordinate respectively and $W_Z$ is angular velocity in Z coordinate.

$$\begin{bmatrix} V_1 \\ V_2 \\ V_3 \end{bmatrix} = J^{-1} \begin{bmatrix} V_X \\ V_Y \\ W_Z \end{bmatrix} \quad \text{Formula 1}$$

where, Jacobian J is obtained below.

$$J^{-1} = \begin{bmatrix} -S_1 & C_1 & L_1 \\ -S_2 & C_2 & L_2 \\ -S_3 & C_3 & L_3 \end{bmatrix}$$

where, $S_1=\sin(\theta_i)$, $C_1=\cos(\theta_i)$, and $V_1$, $V_2$ and $V_3$ are velocity of the first omni-directional wheel 121, the second omni-directional wheel 122 and the third omni-directional wheel 123 respectively. Also, $\theta_i$ is the angle between the X coordinate originated from the center of the toy vehicle 280 and the first omni-directional wheel 121, the second omni-directional wheel 122 and the third omni-directional wheel 123 respectively and $L_i$ is the distance between the center of the toy vehicle 280 and the and the first omni-directional wheel 121, the second omni-directional wheel 122 and the third omni-directional wheel 123 respectively.

Formula 2

At this time, for the toy vehicle 100 is symmetric, $\theta_1$, $\theta_2$ and $\theta_3$ are 90 degrees, 225 degrees, and 315 degrees respectively and assuming $L_1$, $L_2$ and $L_3$ are same, then $V_X$, $V_Y$ and $W_Z$ are given by $$\begin{bmatrix} V_X \\ V_Y \\ W_Z \end{bmatrix} = J \begin{bmatrix} V_1 \\ V_2 \\ V_3 \end{bmatrix} \text{ where,}$$

$$J = \frac{1}{2L(1-\sqrt{2})} \begin{bmatrix} -2\sqrt{2}L & \sqrt{2}L & \sqrt{2}L \\ 0 & L(2-\sqrt{2}) & -L(2-\sqrt{2}) \\ 1 & -\sqrt{2} & -\sqrt{2} \end{bmatrix}$$

According to the formulas given above, the velocities of the toy vehicle 100, $V_X$, $V_Y$ and $W_Z$, depend on the velocities of the first to the third omni-directional wheels 121, 122, 123. Namely, when the first to the first to the third omni-directional wheels 121, 122, 123 are rotated by the first to the third driving elements 131, 132, 133. The velocities of the first to the third omni-directional wheels 121, 122, 123 are alternated with the existence of driving torque for each driving element, the amount of driving torque, and the direction of driving torque. Thus, the combination of each velocity of the first to the third omni-directional wheels 121, 122, 123 determines any motion of the omni-directional toy vehicle 100.

EMBODIMENT 2

Figure 13:
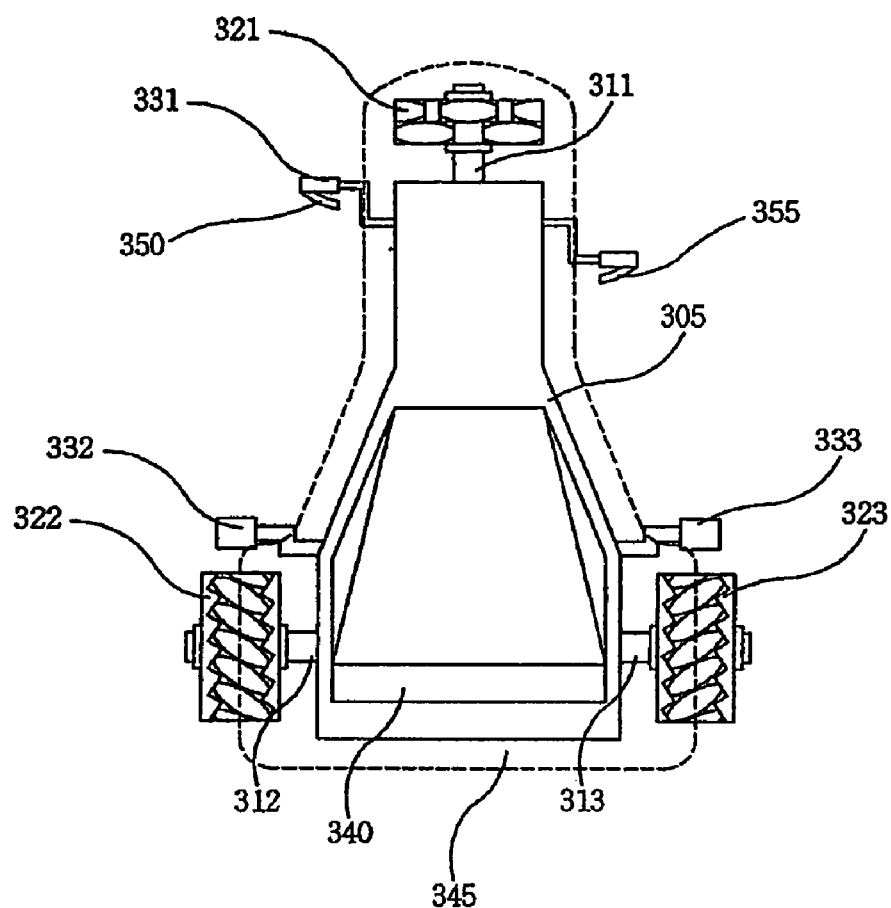
FIG. 13 shows a plan view of the omni-directional toy vehicle according to the second embodiment of the present invention.

FIG. 13 shows a plan view of the omni-directional toy vehicle according to the second embodiment of present invention.

Referring to FIG. 13, the toy vehicle 300 according to this embodiment comprises the frame 305, the first to the third rotating axles 311, 312, 313, the first to the third omni-directional wheels 321, 322, 323, the first to the third driving elements 331, 332, 333, and the seat 340. The housing 345 of which shape may be a car, a motorcycle, or a character, etc. covers the frame 305.

The toy vehicle 300 according to this embodiment is same as the first embodiment of present invention except that the first driving element 331 is driven by operator's hand and the second and the third driving elements 332, 333 by operator's feet respectively and the braking handle 350 and the clutch handle 355 are connected to both side of the first driving element 331 respectively, therefore the description of other components of the toy vehicle 300 is omitted herein.

Hereinafter, operating method of the toy vehicle 300 according to this embodiment of present invention is disclosed as follows.

Referring to FIG. 13 again, the toy vehicle 300 according to this embodiment is same as the first embodiment of present invention except that the first driving element 331 is driven by operator's hand and the second and the third driving elements 332, 333 by operator's feet respectively, therefore the description of its operating method is omitted herein.

EMBODIMENT 3

Figure 14:
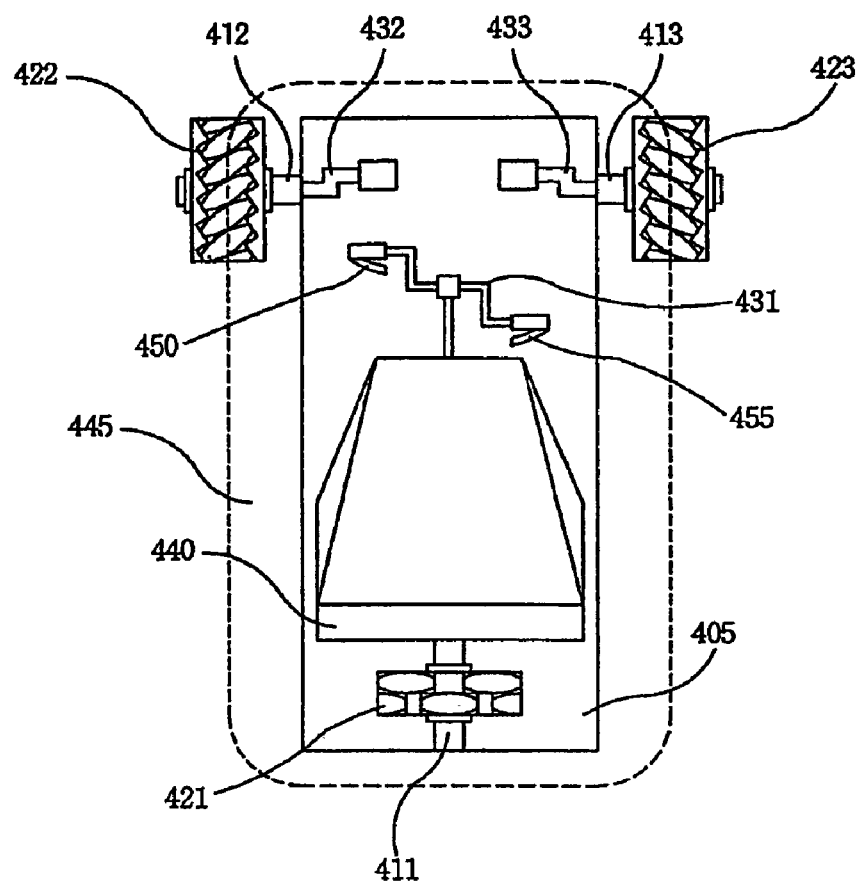
FIG. 14 shows a plan view of the omni-directional toy vehicle according to the third embodiment of the present invention.

FIG. 14 shows a plan view of the omni-directional toy vehicle according to the third embodiment of the present invention.

Referring to FIG. 14, the toy vehicle 400 according to this embodiment comprises the frame 405, the first to the third rotating axles 411, 412, 413, the first to the third omni-directional wheels 421, 422, 423, the first to the third driving elements 431, 432, 433, and the seat 440. The housing 445 of which shape may be a car, a motorcycle, or a character, etc. covers the frame 405.

The toy vehicle 400 according to this embodiment is same as the first embodiment of present invention except that the first omni-directional wheel 421 functions as a rear wheel and the second and the third omni-directional wheels 422, 423 as front wheels respectively. The first driving element 431 is driven by operator's hand and the second and the third driving elements 432, 433 by operator's feet respectively, and the braking handle 450 and the clutch handle 455 are connected to each side of the first driving element 431 respectively. Therefore the description of other components of the toy vehicle 400 is omitted herein.

Hereinafter, operating method of the toy vehicle 400 according to this embodiment of present invention is disclosed as follows.

Referring to FIG. 12 and FIG. 14, the velocity of the toy vehicle is described as follows, where $V_X$ and $V_Y$ are velocities in X and Y coordinate respectively and $W_Z$ is angular velocity in Z coordinate.

$$\begin{bmatrix} V_1 \\ V_2 \\ V_3 \end{bmatrix} = J^{-1} \begin{bmatrix} V_X \\ V_Y \\ W_Z \end{bmatrix} \quad \text{Formula 3}$$

where, Jacobian J is obtained below.

$$J^{-1} = \begin{bmatrix} -S_1 & C_1 & L_1 \\ -S_2 & C_2 & L_2 \\ -S_3 & C_3 & L_3 \end{bmatrix}$$

where, $S_1=\sin(\theta_i)$, $C_1=\cos(\theta_i)$, and $V_1$, $V_2$ and $V_3$ are velocity of the third omni-directional wheel 423, the second 422 and the first omni-directional wheel 421 respectively. Also, $\theta_i$ is the angle between the X coordinate originated from the center of the toy vehicle 280 and the third 423, the second 422 and the first omni-directional wheel 421 respectively and $L_i$ is the distance between the center of the toy vehicle 280 and the and the third 423, the second 422 and the first omni-directional wheel 421 respectively.

Formula 4

At this time, for the toy vehicle 400 is symmetric, $\theta_1$, $\theta_2$ and $\theta_3$ are 45 degrees, 135 degrees, and 270 degrees respectively and assuming $L_1$, $L_2$ and $L_3$ are same, then $V_X$, $V_Y$ and $W_Z$ are given by $$\begin{bmatrix} V_X \\ V_Y \\ W_Z \end{bmatrix} = J \begin{bmatrix} V_1 \\ V_2 \\ V_3 \end{bmatrix} \text{ where,}$$

$$J = \frac{1}{\sqrt{2}+2} \begin{bmatrix} -1 & -1 & 2 \\ \sqrt{2}+1 & -\sqrt{2}-1 & 0 \\ \frac{1}{L} & \frac{1}{L} & \frac{\sqrt{2}}{2L} \end{bmatrix}$$

According to the formulas given above, the velocities of the toy vehicle 400, $V_X$, $V_Y$ and $W_Z$, depend on the velocities of the first to the third omni-directional wheels 421, 422, 423. Namely, when the first to the third omni-directional wheels 421, 422, 423 are rotated by the first to the third driving elements 431, 432, 433, the velocities of the first to the third omni-directional wheels 421, 422, 423 are alternated with the existence of driving torque for each driving element, the amount of driving torque, and the direction of driving torque. Thus, the combination of each velocity of the first to the third omni-directional wheels 421, 422, 423 determines any motion of the omni-directional toy vehicle 400.

EMBODIMENT 4

Figure 15:
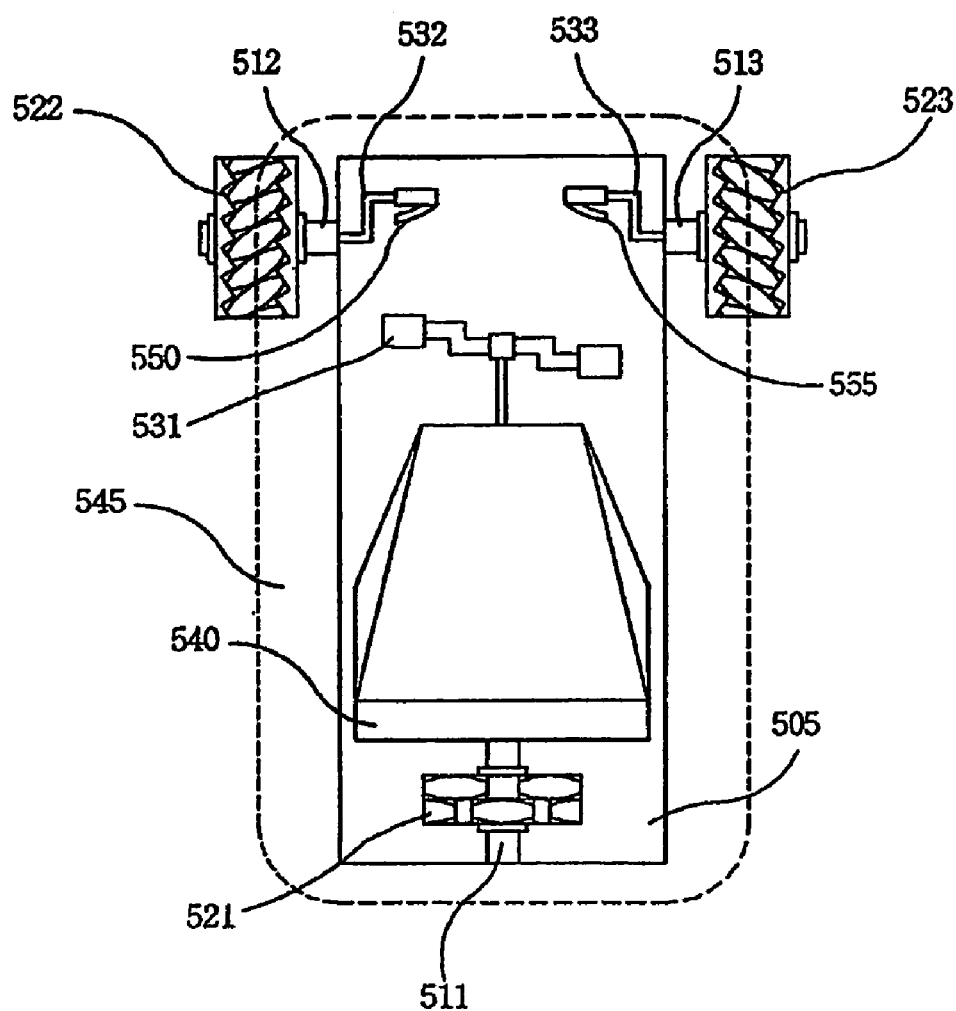
FIG. 15 shows a plan view of the omni-directional toy vehicle according to the forth embodiment of the present invention.

FIG. 15 shows a plan view of the omni-directional toy vehicle according to the forth embodiment of present invention.

Referring to FIG. 15, the toy vehicle 500 according to this embodiment comprises the frame 505, the first to the third rotating axles 511, 512, 513, the first to the third omni-directional wheels 521, 522, 523, the first to the third driving elements 531, 532, 533, and the seat 540. The housing 545 of which shape may he a car, a motorcycle, or a character, etc. covers the frame 505.

The toy vehicle 500 according to this embodiment is same as the first embodiment of present invention except that the first omni-directional wheel 521 functions as a rear wheel and the second and the third omni-directional wheels 522, 523 as front wheels, the first driving element 531 is driven by operator's foot and the second and the third driving elements 532, 533 by operator's hands respectively, and the braking handle 550 and the clutch handle 555 are connected to each side of the second and the third driving element 532, 533 respectively, therefore the description of other components of the toy vehicle 500 is omitted herein.

Hereinafter, operating method of the toy vehicle 500 according to this embodiment of present invention is disclosed as follows.

Referring to FIG. 15 again, the toy vehicle 500 according to this embodiment is same as the first embodiment of present invention except that the first driving element 531 is driven by operator's foot and the second and the third driving elements 532, 533 by operator's hands respectively, therefore the description of its operating method is omitted herein.

EMBODIMENT 5

Figure 16:
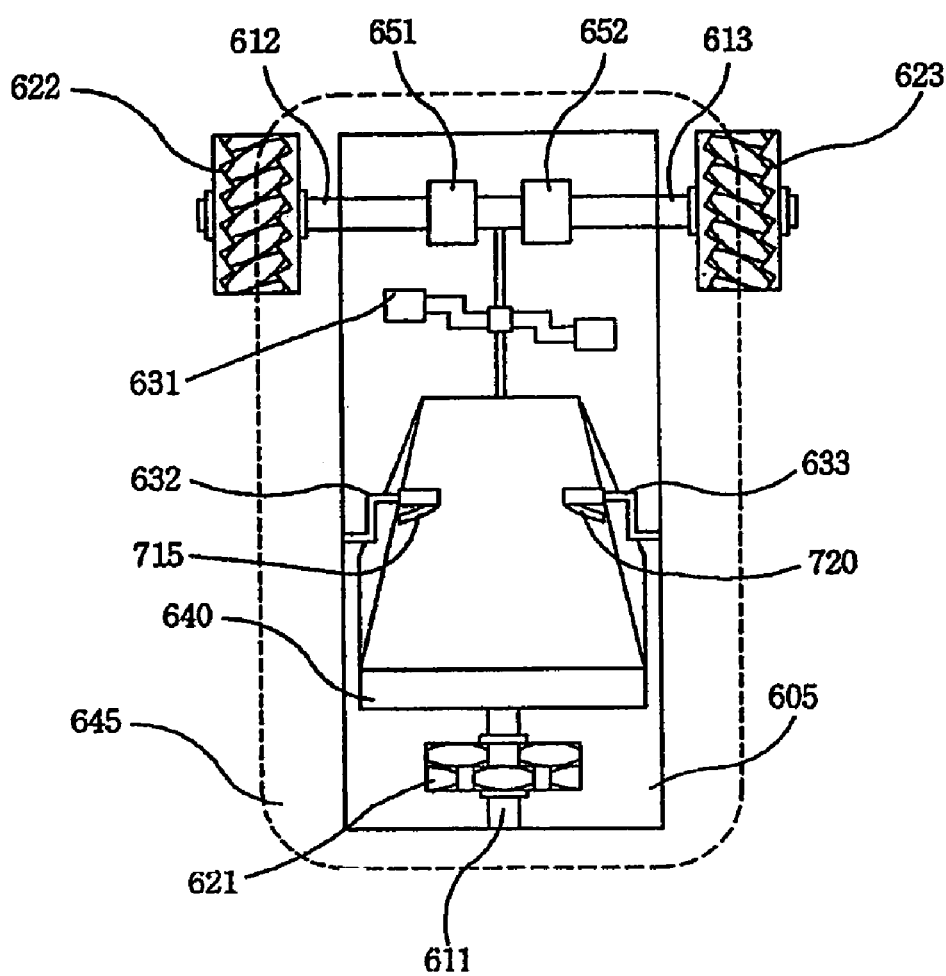
FIG. 16 shows a plan view of the omni-directional toy vehicle according to the fifth embodiment of the present invention.

FIG. 16 shows a plan view of the omni-directional toy vehicle according to the fifth embodiment of present invention.

Referring to FIG. 16, the toy vehicle 600 according to this embodiment comprises the frame 605, the first to the third rotating axles 611, 612, 613, the first to the third omni-directional wheels 621, 622, 623, the first to the third driving elements 631, 632, 633, and the seat 640. The housing 645 of which shape may be a car, a motorcycle, or a character, etc. covers the frame 605.

The first to the third rotating axles 611, 612, 613 are arranged at the lower part of the frame 605 with a rotatable mechanism, the first rotating axle 611 which is perpendicular to the second rotating axle 612 and the third rotating axle 613 is arranged in rear of the frame 605, and the second rotating axle 612 and the third rotating axle 613 of which each one side is connected with the first differential gear 651 and the second differential gear 652 respectively are arranged in front of the frame 605. Also, the first to the third omni-directional wheels 621, 622, 623 are installed at each other side of the first to the third rotating axles 611, 612, 613 respectively. The first to the third driving elements 631, 632, 633 are connected to the frame 605 and make the first to the third omni-directional wheels 621, 622, 623 rotatable by transferring the driving forces of the first to the third rotating axles 611, 612, 613. Furthermore, an operator can take the seat 640 located at the upper part of the frame 605.

The toy vehicle 600 according to this embodiment is same as the first embodiment of present invention except that the first omni-directional wheel 621 functions as a rear wheel and the second and the third omni-directional wheels 622, 623 as front wheels respectively, therefore the description of other components of the toy vehicle 600 is omitted herein.

Figure 17:
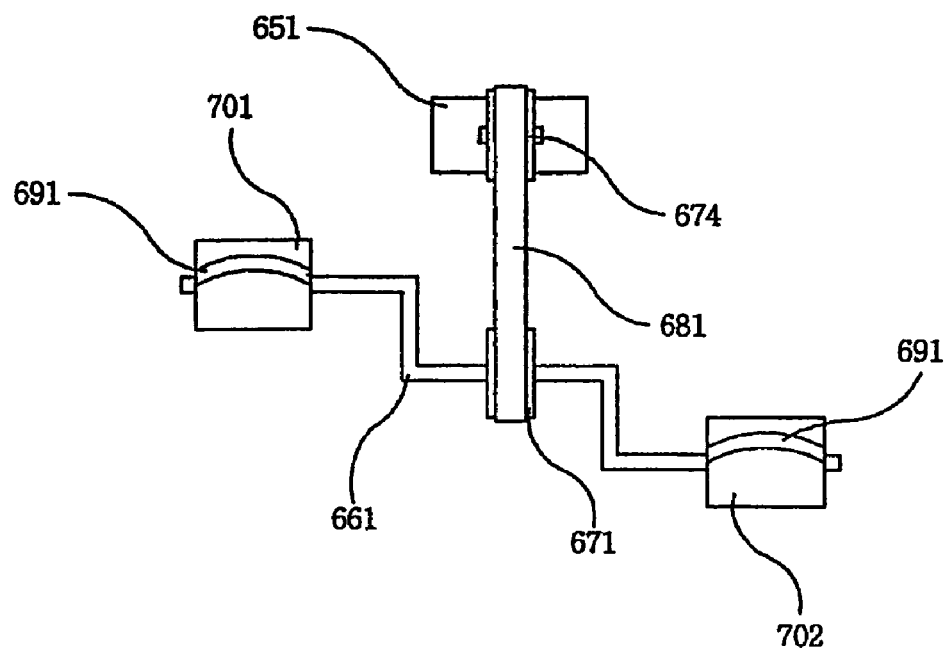
FIG. 17 shows a plan view of the first driving element of the omni-directional toy vehicle shown on FIG. 16.

FIG. 17 shows a plan view of the first driving element of the omni-directional toy vehicle shown on FIG. 16.

Referring to FIG. 16 and FIG. 17, the first driving element 631 for driving the second and the third omni-directional wheel 622, 623 by use of operator's foot comprises the first driving handle 661, the first and the forth driving torque transferring element 671, 674. The first and the second pedal 701, 702 are attached at both sides of the first driving handle 661 and the cover bands 691 of the first and the second pedal 701, 702 male it easy to drive the first driving element 631 manually.

The first driving torque transferring element 671 uses a pulley and is connected to the forth driving torque transferring element 674 via the first belt 681. At this time, the forth driving torque transferring element 674 is connected to the first differential gear 651. Namely, the first differential gear 651 rotates longitudinally according to the longitudinal rotation of the first driving handle 661.

Figure 18:
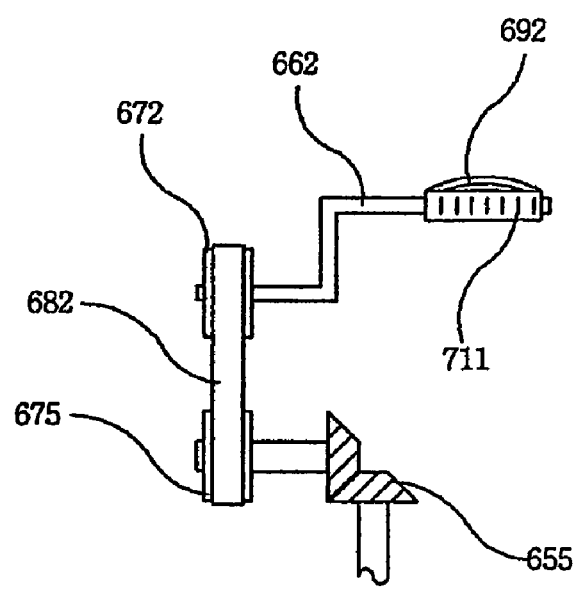
FIG. 18 shows a plan view of the second driving element of the omni-directional toy vehicle shown on FIG. 16.

FIG. 18 shows a plan view of the second driving element of the omni-directional toy vehicle shown on FIG. 16.

Referring to FIG. 16 and FIG. 18, the second driving element 632 for driving the first omni-directional wheel 621 by use of operator's hand comprises the second driving handle 662, the second and the fifth driving torque transferring element 672, 675. The first grip 711 is attached at one side of the second driving handle 662 and the cover band 692 of the first grip 711 make it easy to drive the second driving element 632 manually by means of operator's hand.

The second driving torque transferring element 672 uses a pulley and is connected to the fifth driving torque transferring element 675 via the second belt 682. At this time, the fifth driving torque transferring element 675 includes the bevel gear element 655 of which one side is connected to the first rotating axle 611. Namely, the longitudinal rotation of the second driving handle 662 is changed into the lateral rotation by means of the bevel gear element 655 so that the first omni-directional wheel 621 can rotate laterally in connection with the first rotating axle 611.

Figure 19:
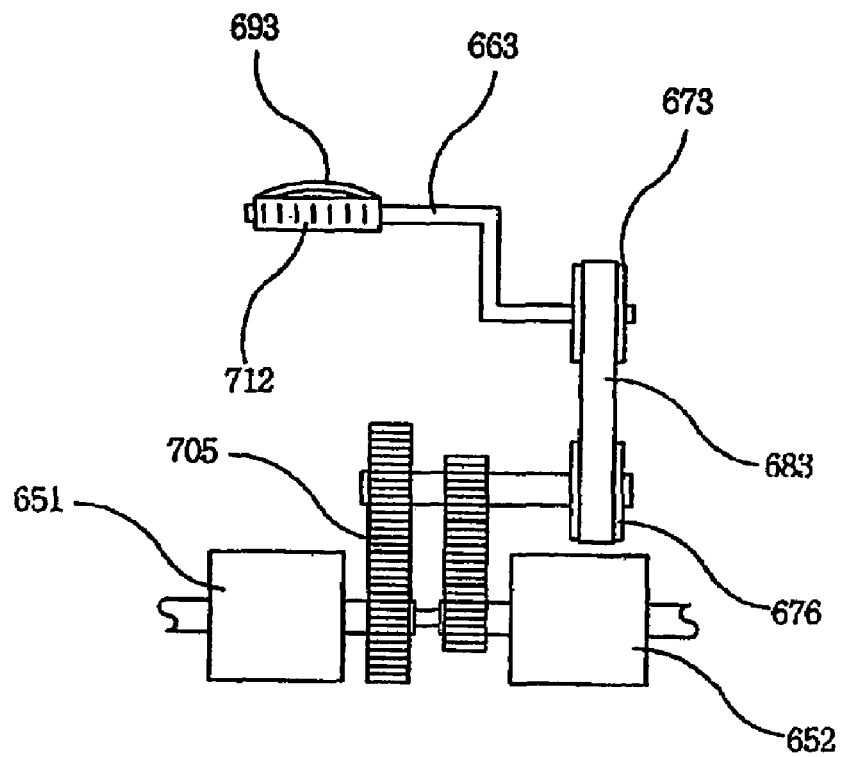
FIG. 19 shows a plan view of the third driving element of the omni-directional toy vehicle shown on FIG. 16.

FIG. 19 shows a plan view of the third driving element of the omni-directional toy vehicle shown on FIG. 16.

Referring to FIG. 16 and FIG. 19, the third driving element 633 for driving the second and the third omni-directional wheel 622, 623 by use of operator's hand comprises the third driving handle 663, the third and the sixth driving torque transferring element 673, 676. The second grip 712 is attached at one side of the third driving handle 663 and the third cover band 693 of the second grip 712 make it easy to drive the third driving element 633 manually by means of operator's hand.

The third driving torque transferring element 673 uses a pulley and is connected to the sixth driving torque transferring element 676 via the third belt 683. At this time, the sixth driving torque transferring element 676 also uses a pulley and is connected to the first and the second differential gear 651, 652 including the gear element 705. Namely, the rotation of the third driving handle 663 determines the rotation of the first and the second differential gear 651, 652.

The braking element 715 and the clutch element 720 of the toy vehicle 600 according to this embodiment are same as those of the first embodiment of present invention therefore the description of them is omitted herein.

Figure 20:
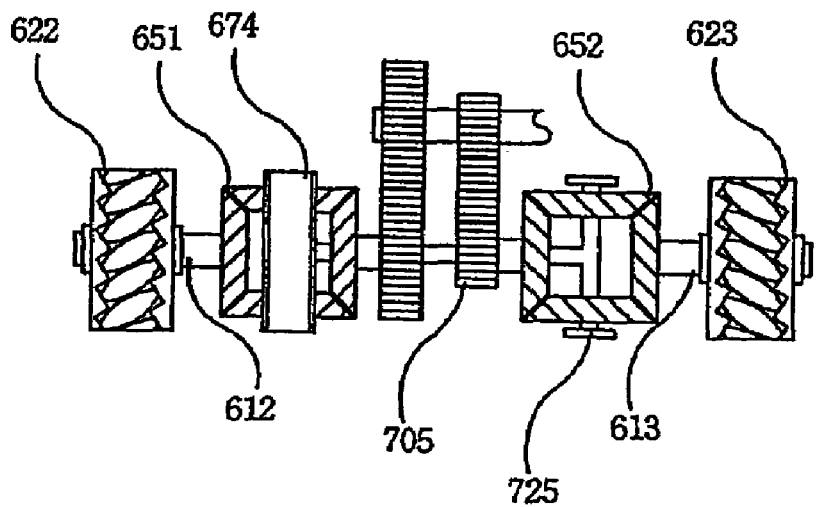
FIG. 20 shows a schematic configuration of the first and the second differential gears of the omni-directional toy vehicle shown on FIG. 16.

FIG. 20 shows a schematic configuration of the first and the second differential gears of the omni-directional toy vehicle shown on FIG. 16.

Referring to FIG. 16 and FIG. 20, the first and second differential gear 651, 652 are connected to the second and the third omni-directional wheels 622, 623 by the second and the third rotating axles 612, 613. The forth driving torque transferring element 674 is connected outside the first differential gear 651 so that the second omni-directional wheel 622 rotates by the driving torque of the first driving element 631. At this time, the one side of the connection axle 725 is connected to the forth driving torque transferring element 674 and the other side to the second differential gear 652, therefore, the third omni-directional wheel 623 rotates in the same direction as that of the second omni-directional wheel 622 by the driving torque of the first driving element 631. Also, the gear element 705 is connected between the first differential gear 651 and the second differential gear 652 so that the driving torque by the third driving element 633 is transmitted to the first and the second differential gear 651, 652 through the gear element 705. Namely, the driving torque by the third driving element 633 is transmitted to the second and the third omni-directional wheel 622, 623 through the first and the second differential gear 651, 652, therefore, there is some amount of difference between velocities of the second and the third omni-directional wheel 622, 623. Accordingly, the combination of rotation of the first and the third driving element 631, 633 makes an effect of independent driving of the second and the third omni-directional wheel 622, 623.

Hereinafter, operating method of the toy vehicle 600 according to this embodiment of present invention is disclosed as follows.

Referring to FIG. 16 again, the toy vehicle 600 according to this embodiment is same as the third embodiment of present invention except that it uses the first and the second differential gear 651, 652 connected to the second and the third rotating axle 612, 613 respectively therefore the description of its operating method is omitted herein.

INDUSTRIAL APPLICABILITY

As described above, the omni-directional toy vehicle according to present invention can move in all direction of forward, backward, rotational, left and right movement by applying omni-directional wheels to all front and rear wheels and driving them independently. Also, it can be driven and steered simultaneously by means of driving combinations of each omni-directional wheel without any additional steering element and make an operator be interested in the manual operation of omni-directional wheels.

What is claimed is:

1. In a manually driven toy vehicle, an omni-directional toy vehicle characterized by comprising; a frame composing the body of the toy vehicle; at least three or more rotating axles which are installed at the lower part of the frame with a rotatable mechanism; at least three or more omni-directional wheels which are connected to at least the three or more rotating axles; at least three or more driving element which are connected to at least the three rotating axles and drive at least the three or more omni-directional wheels; and a seat located at the upper part of the frame.

2. The omni-directional toy vehicle as claimed in claim 1, characterized in that the three or more rotating axles constitute the first to the third rotating axle and the one among the first to the third rotating axles is arranged perpendicular to the others.

3. The omni-directional toy vehicle as claimed in claim 2, characterized in that a differential gear is installed at each two among the first to the third rotating axle.

4. The omni-directional toy vehicle as claimed in claim 1, characterized in that the three or more omni-directional wheels constitute the first to the third omni-directional wheel.

5. The omni-directional toy vehicle as claimed in claim 4, characterized in that the first to the third omni-directional wheel are composed of one or two of passive roller type omni-directional wheel.

6. The omni-directional toy vehicle as claimed in claim 4, characterized in that the one among the first to the third omni-directional wheel is the front wheel and the others are the rear wheel.

7. The omni-directional toy vehicle as claimed in claim 4, characterized in that the one among the first to the third omni-directional wheel is the rear wheel and the others are the front wheel.

8. The omni-directional toy vehicle as claimed in claim 1, characterized in that the three or more driving elements constitute the first to the third driving element.

9. The omni-directional toy vehicle as claimed in claim 8, the first to the third driving elements characterized by comprising; the first to the third driving handles of which each one side is connected to the frame and which are rotatable; the first to the third driving torque transferring elements which are connected to the one side of the first to the third driving handles respectively; and the forth to the sixth driving torque transferring elements which are connected to the first to the third driving torque transferring elements respectively.

10. The omni-directional toy vehicle as claimed in claim 9, characterized in that first to the third cover bands are connected between both sides of the first to the third driving handles.

11. The omni-directional toy vehicle as claimed in claim 9, characterized in that the first to the sixth driving torque transferring elements are a gear or a pulley.

12. The omni-directional toy vehicle as claimed in claim 11, characterized in that the first to the third driving torque transferring elements and the forth to the sixth driving torque transferring elements are connected with a chain or a belt respectively.

13. The omni-directional toy vehicle as claimed in claim 9, characterized in that the one among the first to the third driving handles is for driving the rear wheel and the others are for driving the front wheels.

14. The omni-directional toy vehicle as claimed in claim 13, characterized in that the handle for driving the front wheel is operated by an operator's foot and the handle for driving the rear wheel by an operator's hand respectively.

15. The omni-directional toy vehicle as claimed in claim 13, characterized in that the handle for driving the front wheel is operated by an operator's hand and the handle for driving the rear wheel by an operator's foot respectively.

16. The omni-directional toy vehicle as claimed in claim 9, characterized in that the one among the first to the third driving handles is for driving the front wheel and the others are for driving the rear wheels.

17. The omni-directional toy vehicle as claimed in claim 16, characterized in that the handle for driving the front wheel is operated by an operator's foot and the handle for driving the rear wheel by an operator's hand respectively.

18. The omni-directional toy vehicle as claimed in claim 16, characterized in that the handle for driving the front wheel is operated by an operator's hand and the handle for driving the rear wheel by an operator's foot respectively.

19. The omni-directional toy vehicle as claimed in claim 4, characterized in that braking elements for the first to the third omni-directional wheels are additionally equipped with.

20. The omni-directional toy vehicle as claimed in claim 19, the braking element characterized by comprising; the braking handle which is connected to the one among the first to the third driving handles; the first to the third braking wires which are connected to the each one side of the first to the third braking handles and extended to the first to the third omni-directional wheels; and the first to the third braking devices which are connected to the other side of the first to the third braking wires and installed near the circumferences of the first to the third omni-directional wheels.

21. The omni-directional toy vehicle as claimed in claim 19, characterized in that the first to the third braking devices stop rotating the first to the third omni-directional wheels simultaneously.

22. The omni-directional toy vehicle as claimed in claim 4, characterized in that a clutch is additionally provided for intermitting selectively the driving torque which is transmitted to the first to the third omni-directional wheels.

23. The omni-directional toy vehicle as claimed in claim 22, characterized in that the clutch is a manually or automatically operated type.

24. The omni-directional toy vehicle as claimed in claim 23, the manually operated type clutch characterized by comprising; the clutch handle which is connected to the one among the first to the third driving handles; the first to the third clutch wires which are connected to the one side of the clutch handle and extended to the first to the third omni-directional wheels; and the first to the third clutch devices which are connected to the other side of the first and the third clutch wires and installed near the circumferences of the forth to the sixth driving torque transferring elements.

25. The omni-directional toy vehicle as claimed in claim 22, characterized in that the clutch element intermits simultaneously the driving torques transmitted to the first and the third omni-directional wheels.

26. The omni-directional toy vehicle as claimed in claim 1, characterized in that a housing covers the frame.

27. The omni-directional toy vehicle as claimed in claim 26, characterized in that the housing is the shape of a car, a motorcycle, or a character.

* * * * *